(12) United States Patent
Hu et al.

(10) Patent No.: US 7,359,187 B2
(45) Date of Patent: Apr. 15, 2008

(54) APPARATUS FOR MOUNTING REMOVABLY A DISK DRIVE IN AN ELECTRONIC DEVICE

(75) Inventors: Chien-Ming Hu, Tainan Hsien (TW); Kuo-Kuang Liu, Nan-Tou Hsien (TW)

(73) Assignee: Universal Scientific Industrial Co., Ltd. (TW)

( * ) Notice: Subject to any disclaimer, the term of this patent is extended or adjusted under 35 U.S.C. 154(b) by 223 days.

(21) Appl. No.: 11/366,756

(22) Filed: Mar. 2, 2006

(65) Prior Publication Data

US 2007/0206321 A1    Sep. 6, 2007

(51) Int. Cl.
*G06F 1/16*    (2006.01)
(52) U.S. Cl. .................. 361/685; 439/589; 360/97.02; 235/381
(58) Field of Classification Search ................ 439/281, 439/275, 589; 235/486, 381; 360/97.02, 360/97.03; 206/307; 361/679–687, 724–727
See application file for complete search history.

(56) References Cited

U.S. PATENT DOCUMENTS 5,229,919 A * 7/1993 Chen .......................... 361/685
2007/0211424 A1* 9/2007 Liu et al. .................... 361/685

* cited by examiner

*Primary Examiner*—Hung Van Duong
(74) *Attorney, Agent, or Firm*—Ostrolenk, Faber, Gerb & Soffen, LLP (57) ABSTRACT

An apparatus includes a casing, an electrical connector, and a latch unit. The electrical connector is provided in the casing, and is coupled electrically to a terminal of a disk drive when the latter is received in the casing. The latch unit includes a latch member that is provided on the disk drive, a first interlocking member that is formed on the latch member, an operating member that is pivoted to the casing, and a second interlocking member that is formed on the operating member, and that engages the first interlocking member when the electrical connector is connected to the terminal of the disk drive. The operating member is operable so as to disengage the second interlocking member from the first interlocking member, thereby permitting removal of the disk drive form the casing.

5 Claims, 11 Drawing Sheets

APPARATUS FOR MOUNTING REMOVABLY A DISK DRIVE IN AN ELECTRONIC DEVICE

BACKGROUND OF THE INVENTION

1. Field of the Invention

The invention relates to an apparatus for mounting removably a disk drive in an electronic device.

2. Description of the Related Art

Figure 1:
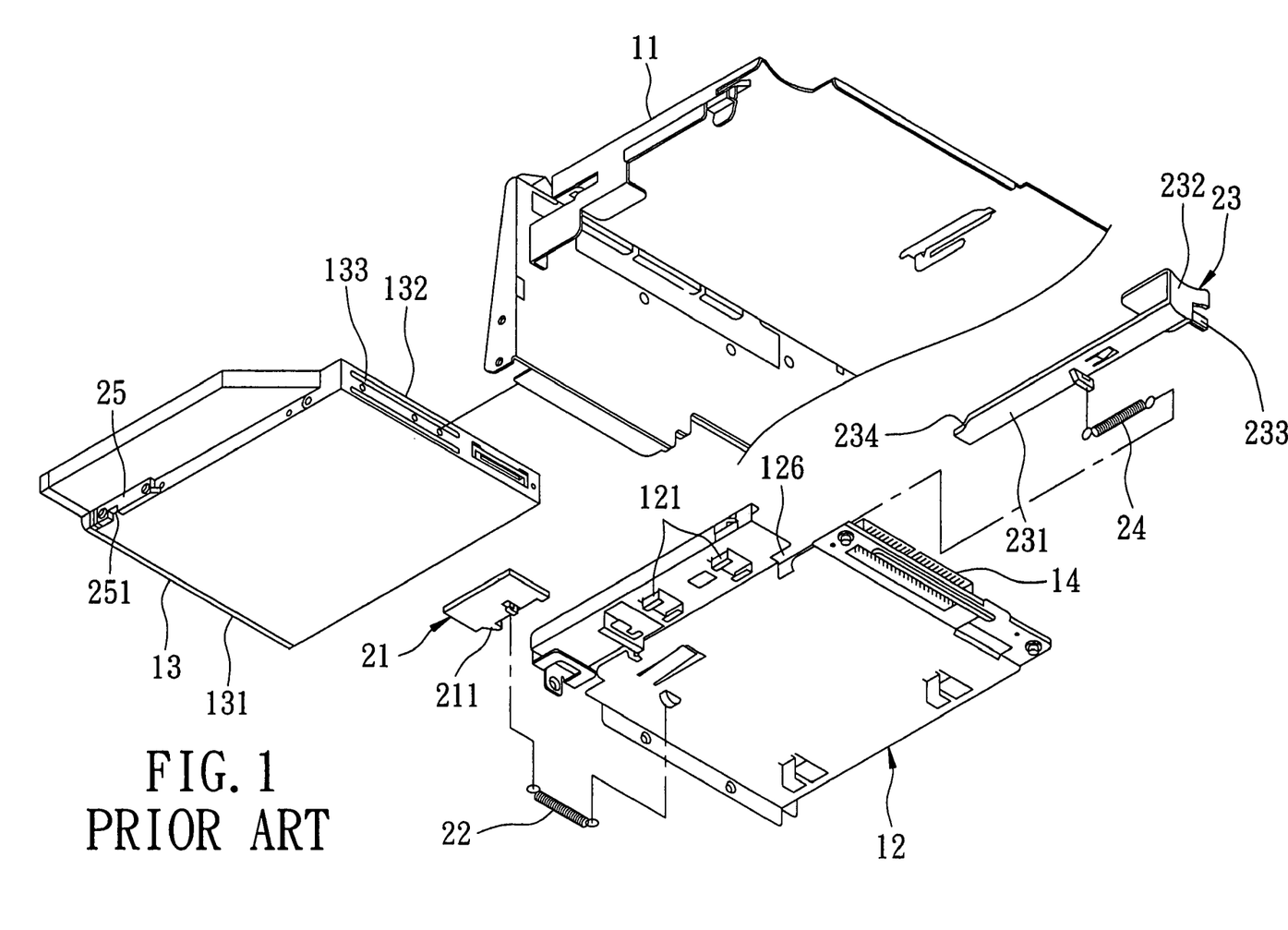
FIG. 1 is an exploded perspective view of a conventional apparatus for mounting removably a disk drive in an electronic device.

Apparatuses that permit installation and removal of a disk drive, such as a thin-type optical disk drive, in and from an electronic device, such as a personal computer, without the use of a tool are well known. One such known apparatus is disclosed in Taiwanese Utility Model M260829. As shown in FIG. 1, the known apparatus includes a disk drive casing 12, an electrical connector 14, and a latch unit.

The disk drive casing 12 serves to receive a disk drive 13 therein, and is mounted securely on a disk drive bay 11 of an electronic device (not shown).

The disk drive 13 has a front end 131, and a rear end 132 that is opposite to the front end 131 thereof and that is provided with a terminal 133.

The electrical connector 14 is provided on the disk drive casing 12, and is coupled electrically to the terminal 133 of the disk drive 13 when the disk drive 13 is received in the disk drive casing 12.

Figure 2:
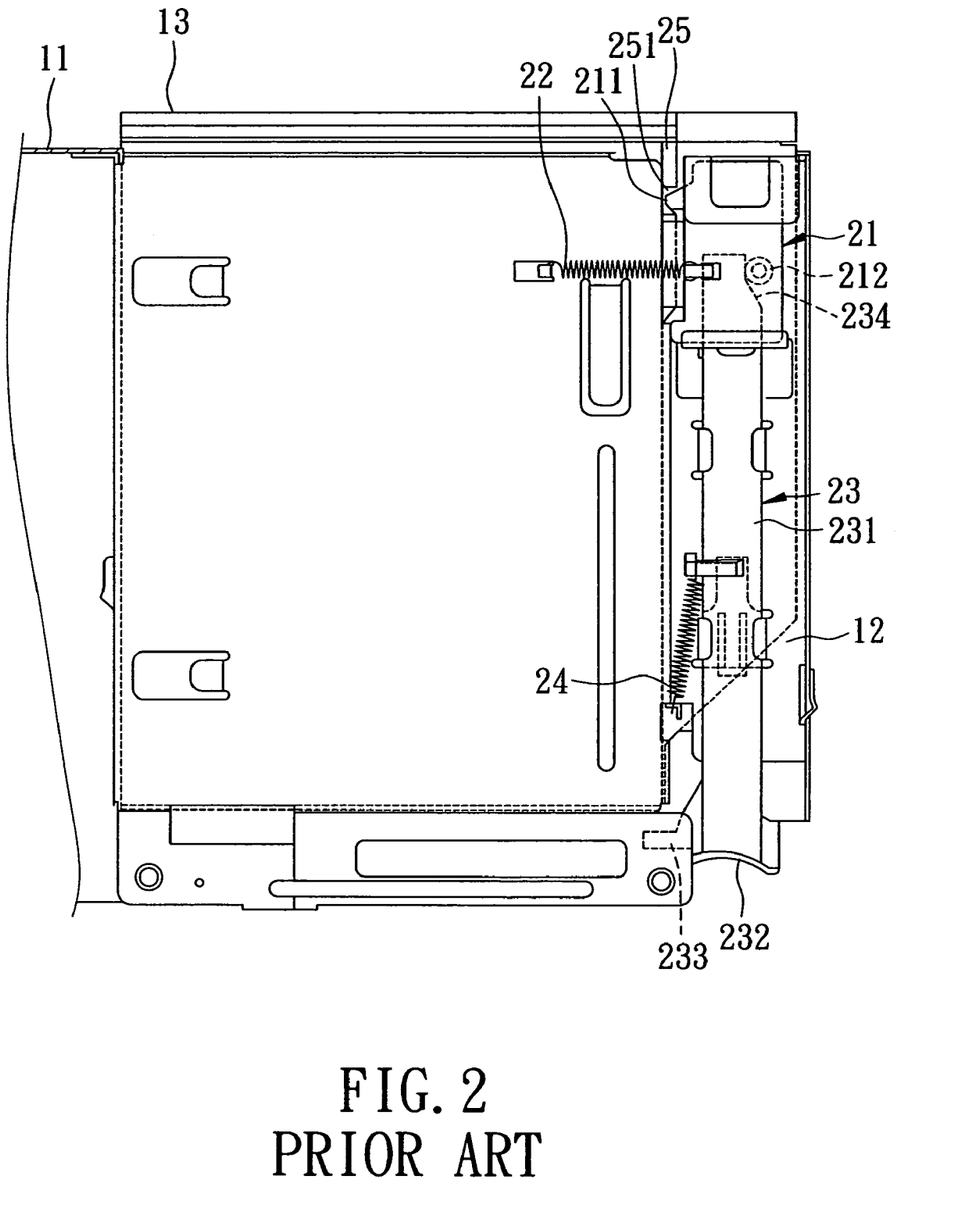
FIG. 2 is a fragmentary schematic view of the conventional apparatus to illustrate a state where a latch unit thereof is disposed at a latched position.
Figure 3:
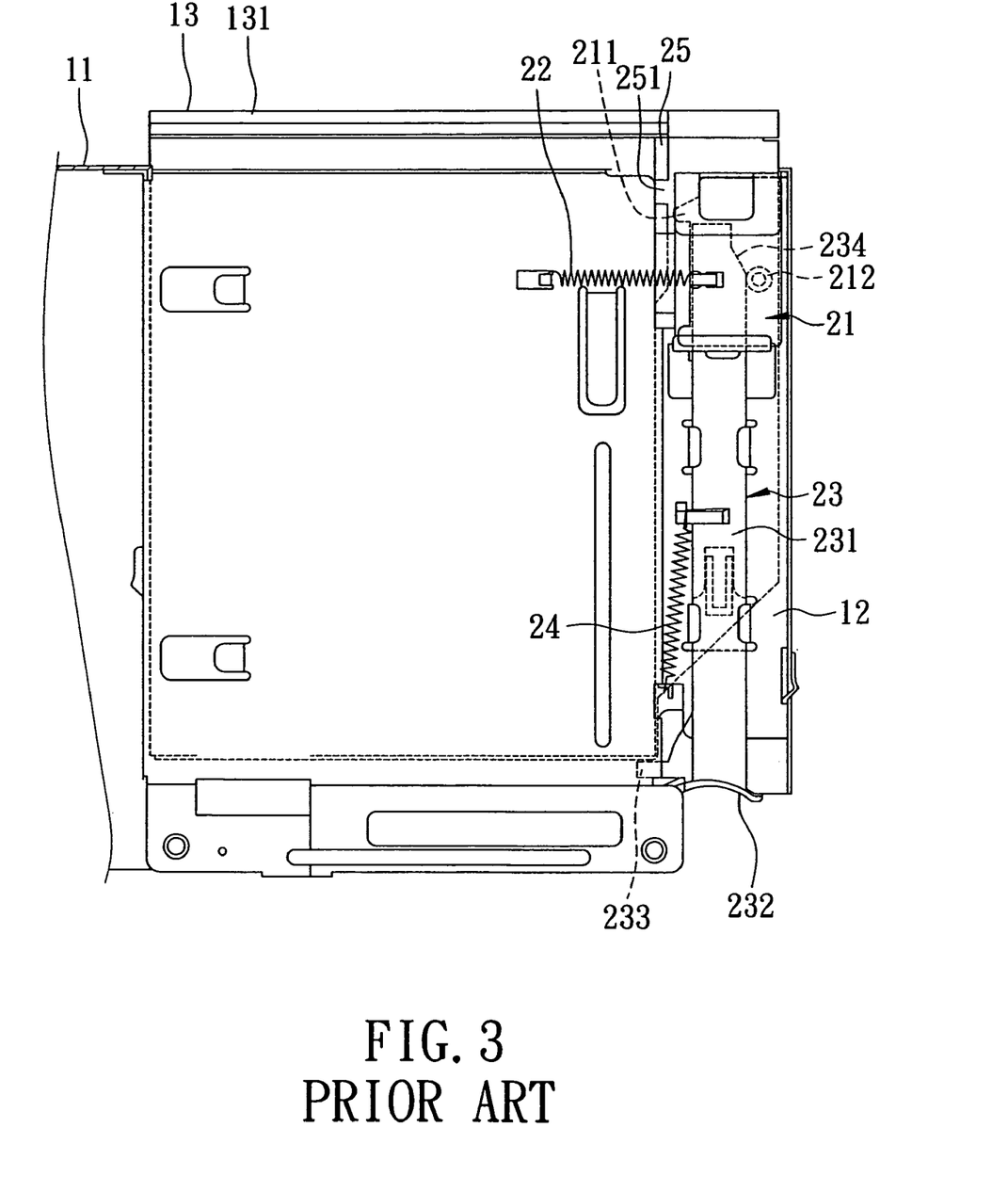
FIG. 3 is a fragmentary schematic view of the conventional apparatus to illustrate a state where the latch unit thereof is disposed at an unlatched position.

The latch unit serves to retain removably the disk drive 13 in the disk drive casing 12. In particular, the latch unit includes first and second latch members 25, 21, first and second interlocking members 251, 211, and an operating member 23. The first latch member 25 is provided on a lateral side of the disk drive 13. The first interlocking member 251 is in the form of an engaging groove that is formed in the first latch member 25. The second latch member 21 is mounted movably on the disk drive casing 12. The second interlocking member 211 is in the form of an engaging protrusion that is formed on the second latch member 21. The second latch member 21 is movable relative to the disk drive casing 12 between a latched position, where the second interlocking member 211 engages the first interlocking member 251, thereby retaining releasably the disk drive 13 in the disk drive casing 12, as best shown in FIG. 2, and an unlatched position, where the second interlocking member 211 disengages from the first interlocking member 251, thereby permitting removal of the disk drive 13 from the disk drive casing 12, as best shown in FIG. 3.

The latch unit further includes a first biasing member 22 for biasing the second latch member 21 to the latched position.

The operating member 23 is mounted movably on the disk drive casing 12, and has a middle portion 231, and first and second end portions 234, 233 that extend in different directions from the middle portion 231. The operating member 23 is movable relative to the disk drive casing 12 in a first axial direction, and a second axial direction opposite to the first axial direction.

The latch unit further includes a guide 121 that is connected slidably to the middle portion 231 of the operating member 23 for guiding movement of the operating member 23 in the first and second axial directions.

The latch unit further includes a cam arrangement that permits movement of the second latch member 21 to the unlatched position against the biasing action of the first biasing member 22 when the operating member 23 is moved in the first axial direction, and that permits movement of the second latch member 21 to the latched position when the operating member 23 is moved in the second axial direction. The cam arrangement includes a cam formed on the first end portion 234 of the operating member 23, and a cam follower 212 provided on the second latch member 21.

The latch unit further includes a second biasing member 24 for biasing the operating member 23 in the second axial direction.

The operating member 23 further has a push portion 232 that extends from the middle portion 231 thereof for facilitating movement of the operating member 23 in the first axial direction against the biasing action of the second biasing member 24.

The second end portion 233 of the operating member 23, as illustrated in FIG. 3, pushes the rear end 132 of the disk drive 13 so as to disconnect the terminal 133 of the disk drive 13 from the electrical connector 14 when the operating member 23 is moved in the first axial direction.

Although the aforementioned known apparatus achieves its intended purpose, the latch unit of the known apparatus is complicated in structure.

SUMMARY OF THE INVENTION

Therefore, the object of the present invention is to provide an apparatus that serves to mount removably a disk drive in an electronic device, and that has a simplified latch unit for retaining releasably the disk drive therein.

According to the present invention, an apparatus for mounting removably a disk drive in an electronic device comprises a disk drive casing, an electrical connector, and a latch unit. The disk drive has a front end, and a rear end that is opposite to the front end thereof and that is provided with a terminal. The disk drive casing is adapted to receive the disk drive therein, and is adapted to be mounted in the electronic device. The electrical connector is provided in the disk drive casing, and is adapted to be coupled electrically to the terminal of the disk drive when the disk drive is received in the disk drive casing. The latch unit is adapted for retaining removably the disk drive in the disk drive casing, and includes a latch member, first and second interlocking members, and an operating member. The latch member is adapted to be provided on the disk drive. The first interlocking member is formed on the latch member. The operating member has a pivot portion that is pivoted to the disk drive casing, and first and second end portions that extend in different directions from the pivot portion. The second interlocking member is formed on the first end portion of the operating member, and engages the first interlocking member when the electrical connector is connected to the terminal of the disk drive. The first end portion of the operating member is operable so as to rotate the pivot portion of the operating member in a first angular direction such that the second interlocking member disengages from the first interlocking member, and such that the second end portion of the operating member pushes the rear end of the disk drive so as to disconnect the terminal of the disk drive from the electrical connector.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 4:
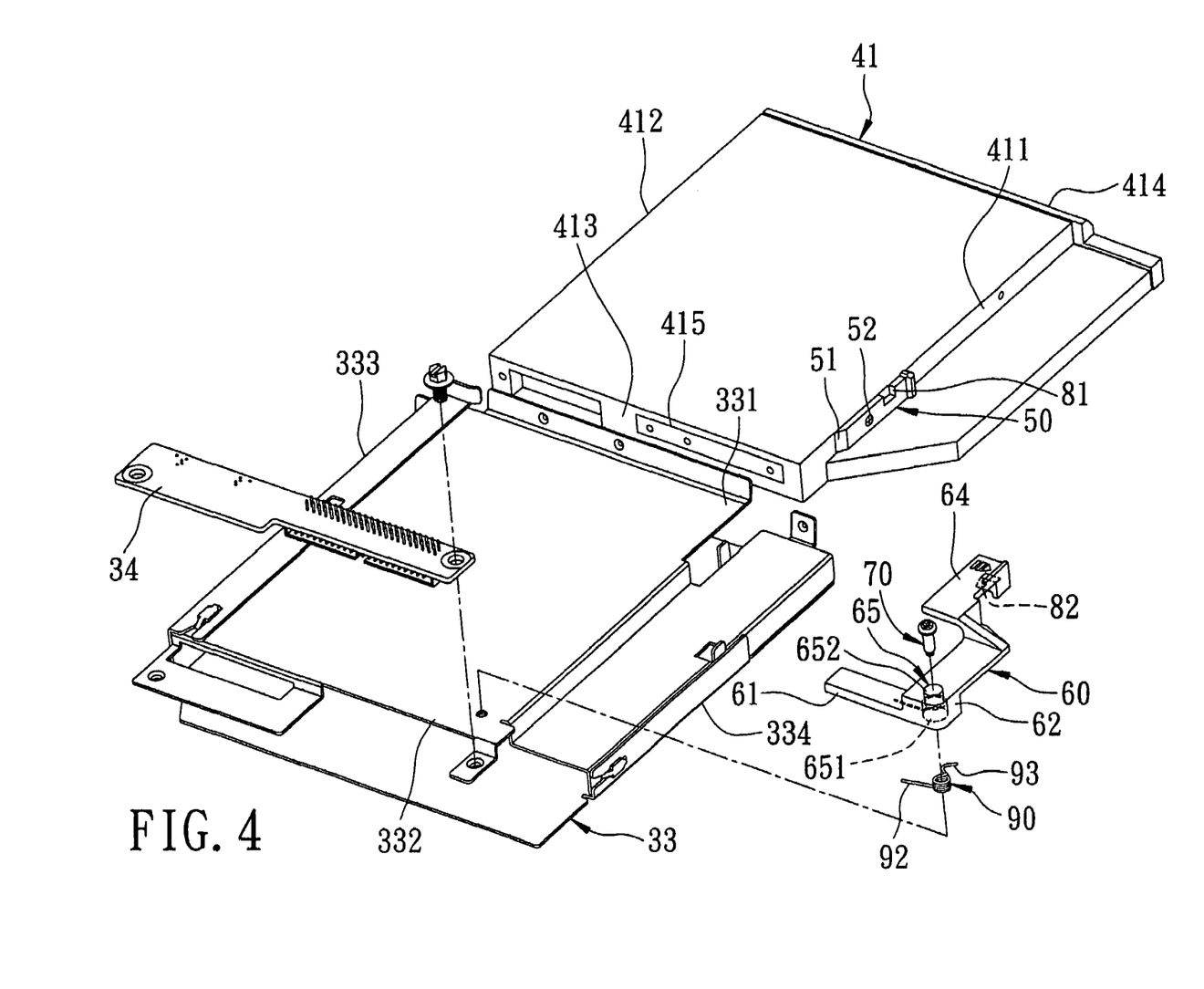
FIG. 4 is an exploded perspective view of the preferred embodiment of an apparatus for mounting removably a disk drive in an electronic device according to the present invention.

Referring to FIG. 4, the preferred embodiment of an apparatus according to this invention is shown to include a disk drive casing 33, an electrical connector 34, and a latch unit.

The apparatus is applicable for mounting removably a disk drive 41, such as a thin-type optical disk drive, in an electronic device 32 (see FIG. 6), such as a personal computer, in a manner that will be described hereinafter.

The electronic device 32 includes a disk drive bay that has a front open end 321.

The disk drive 41 is generally rectangular in shape, and has opposite front and rear ends 414, 413, and left and right ends 412, 411. The rear end 413 of the disk drive 41 is provided with a terminal 415.

The disk drive casing 33 is mounted securely on the disk drive bay of the electronic device 32, serves to receive the disk drive 41 therein, corresponds to the shape of the disk drive 41, and has opposite front and rear ends 331, 332, and left and right ends 333, 334.

The electrical connector 34 is mounted on the rear end 332 of the disk drive casing 33, and is connected electrically to the terminal 415 of the disk drive 41 when the disk drive 41 is received in the disk drive casing 33.

The latch unit serves to retain releasably the disk drive 41 on the disk drive casing 33. In particular, the latch unit includes a latch member 50, an operating member 60, and first and second interlocking members 81, 82.

The latch member 50 of the latch unit is fastened to the right end 411 of the disk drive 41 with the use of a screw 52, and has an end portion that is formed with a chamfer 51.

The operating member 60 of the latch unit has a pivot portion 62, and first and second end portions 64, 61. The pivot portion 62 of the operating member 60 is pivoted to the disk drive casing 33. In particular, with further reference to FIG. 5, the pivot portion 62 of the operating member 60 is formed with a pivot hole 65. A pivot pin 70 is inserted through the pivot hole 65 in the pivot portion 62 of the operating member 60 and is threadedly engaged to the disk drive casing 33. The first and second end portions 64, 61 of the operating member 60 extend in different directions from the pivot portion 62 of the operating member 60. That is, the first end portion 64 of the operating member 60 extends toward the front end 331 of the disk drive casing 33, whereas the second end portion 61 of the operating member 60 extends toward the left end 333 of the disk drive casing 33.

Figure 6:
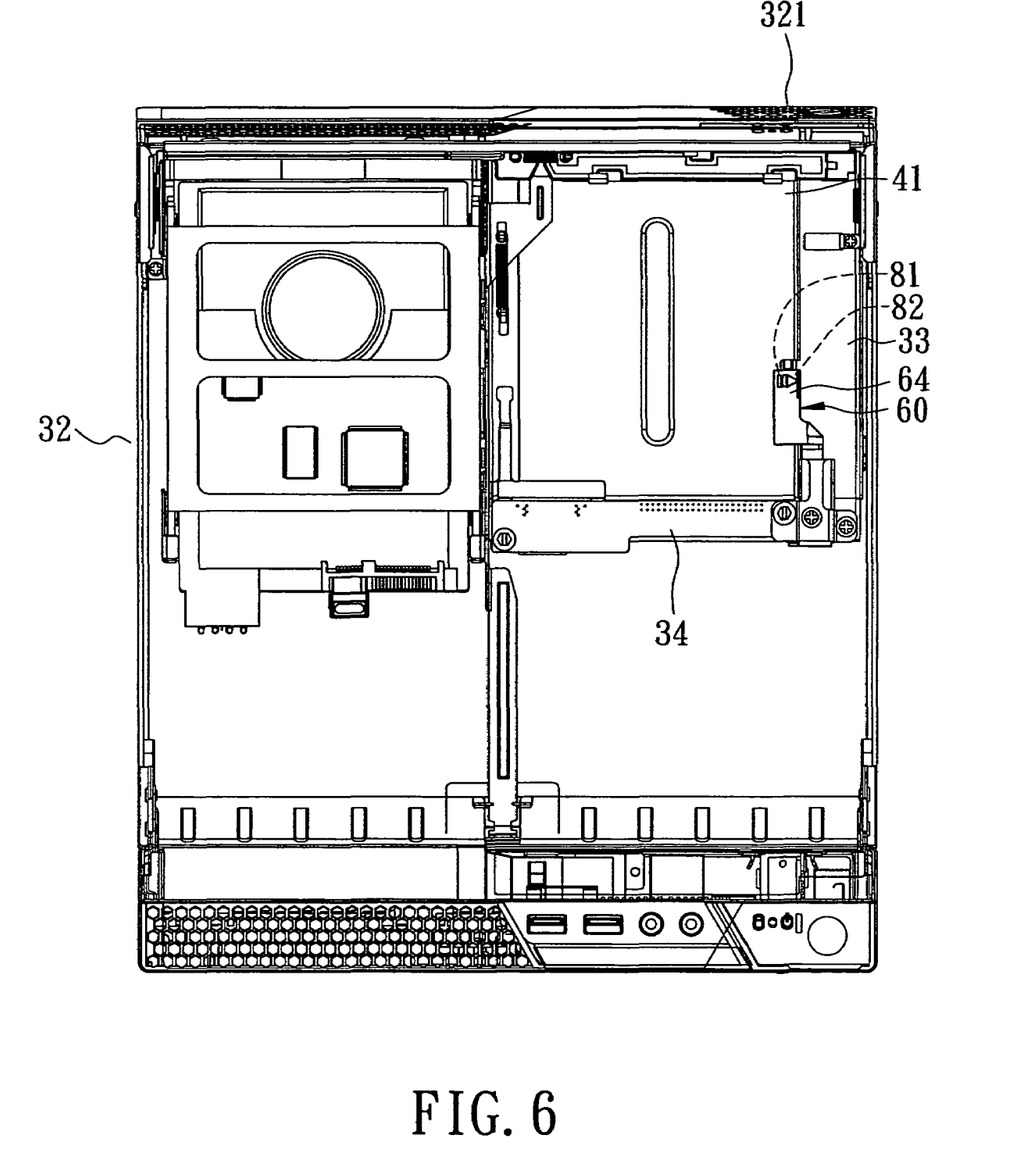
FIG. 6 is a schematic view of the preferred embodiment to illustrate a state where a latch unit thereof is disposed at a latched position.

In this embodiment, the first interlocking member 81 of the latch unit is in the form of an engaging groove that is formed in the latch member 50. The second interlocking member 82 of the latch unit is in the form of an engaging protrusion that is formed on the first end portion 64 of the operating member 60, and that engages releasably the first interlocking member 81 when the electrical connector 34 is connected to the terminal 415 of the disk drive 41, as best shown in FIG. 6.

In an alternative embodiment, the first interlocking member 81 of the latch unit is formed in the first end portion 64 of the operating member 60, whereas the second interlocking member 82 of the latch unit is formed on the latch member 50.

Figure 7:
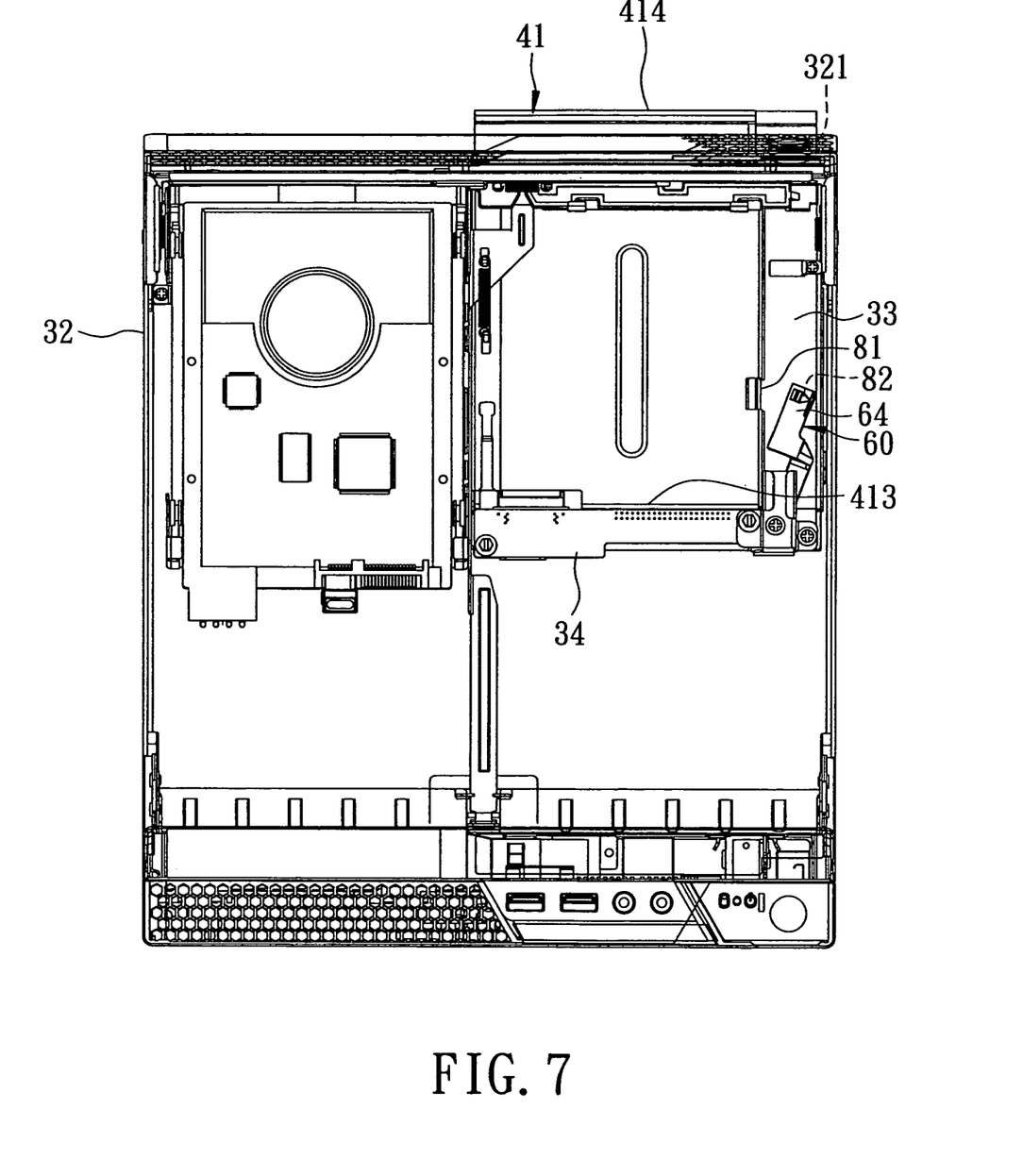
FIG. 7 is a schematic view of the preferred embodiment to illustrate a state where the latch unit thereof is disposed at an unlatched position.

With further reference to FIG. 7, the first end portion 64 of the operating member 60 is operable so as to rotate the pivot portion 62 (see FIG. 4) of the operating member 60 in a first angular direction such that the second interlocking member 82 disengages from the first interlocking member 81, and such that the second end portion 61 (see FIG. 4) of the operating member 60 pushes the rear end 413 of the disk drive 41 so as to disconnect the terminal 415 of the disk drive 41 from the electrical connector 34 and so as to dispose the front end 414 of the disk drive 41 externally of the electronic device 32 through the front open end 321 of the disk drive bay.

Figure 5:
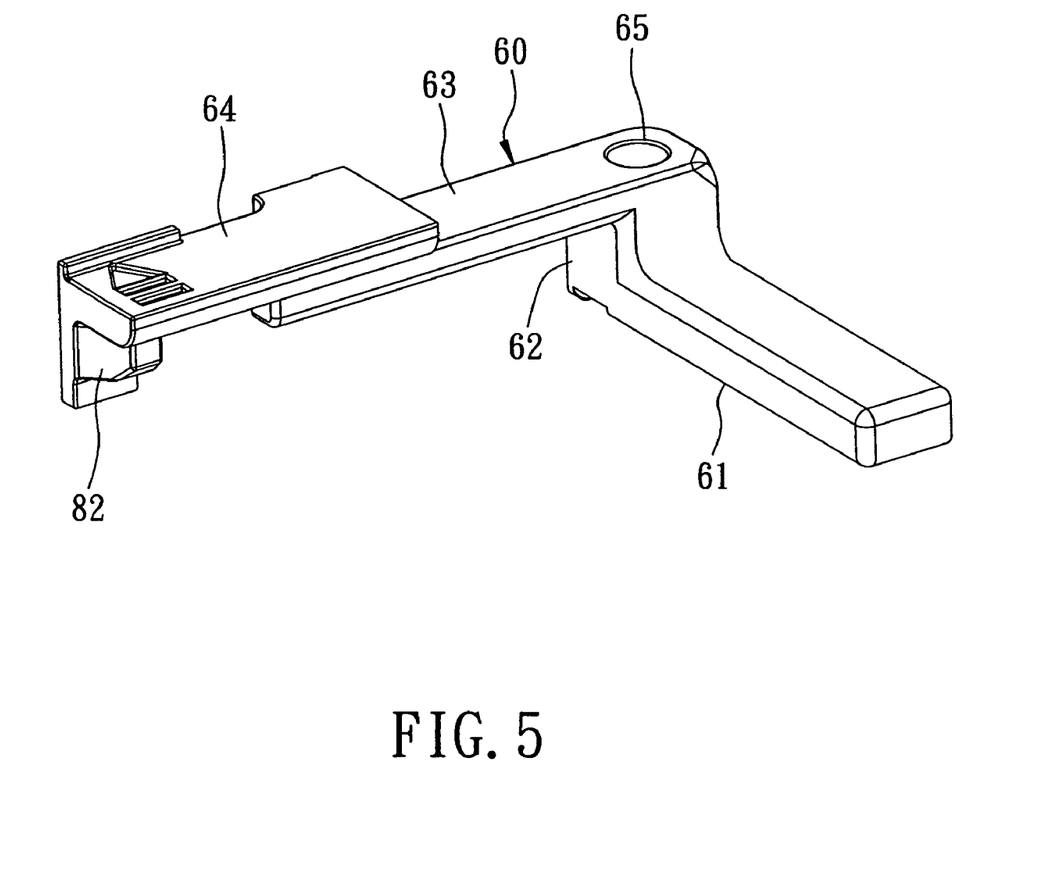
FIG. 5 is a perspective view to illustrate an operating member of a latch unit of the preferred embodiment.

The latch unit further includes a biasing member 90 for biasing the pivot portion 62 of the operating member 60 in a second angular direction opposite to the first angular direction. In particular, the pivot hole 65 in the pivot portion 62 of the operating member 60 has a first hole section 652, and a second hole section 651 which is opposite to and which has a larger diameter than that of the first hole section 652. In this embodiment, the biasing member 90 is a torsion spring that is disposed in the second hole section 651 of the pivot hole 65 in the pivot portion 62 of the operating member 60, that is sleeved on the pivot pin 70, and that has a first spring end 92 acting on the second end portion 61 of the operating member 60 and a second spring end 93 acting on the disk drive casing 33.

It is noted herein that, in an alternative embodiment, the latch unit may be dispensed with the biasing member 90.

Figure 8:
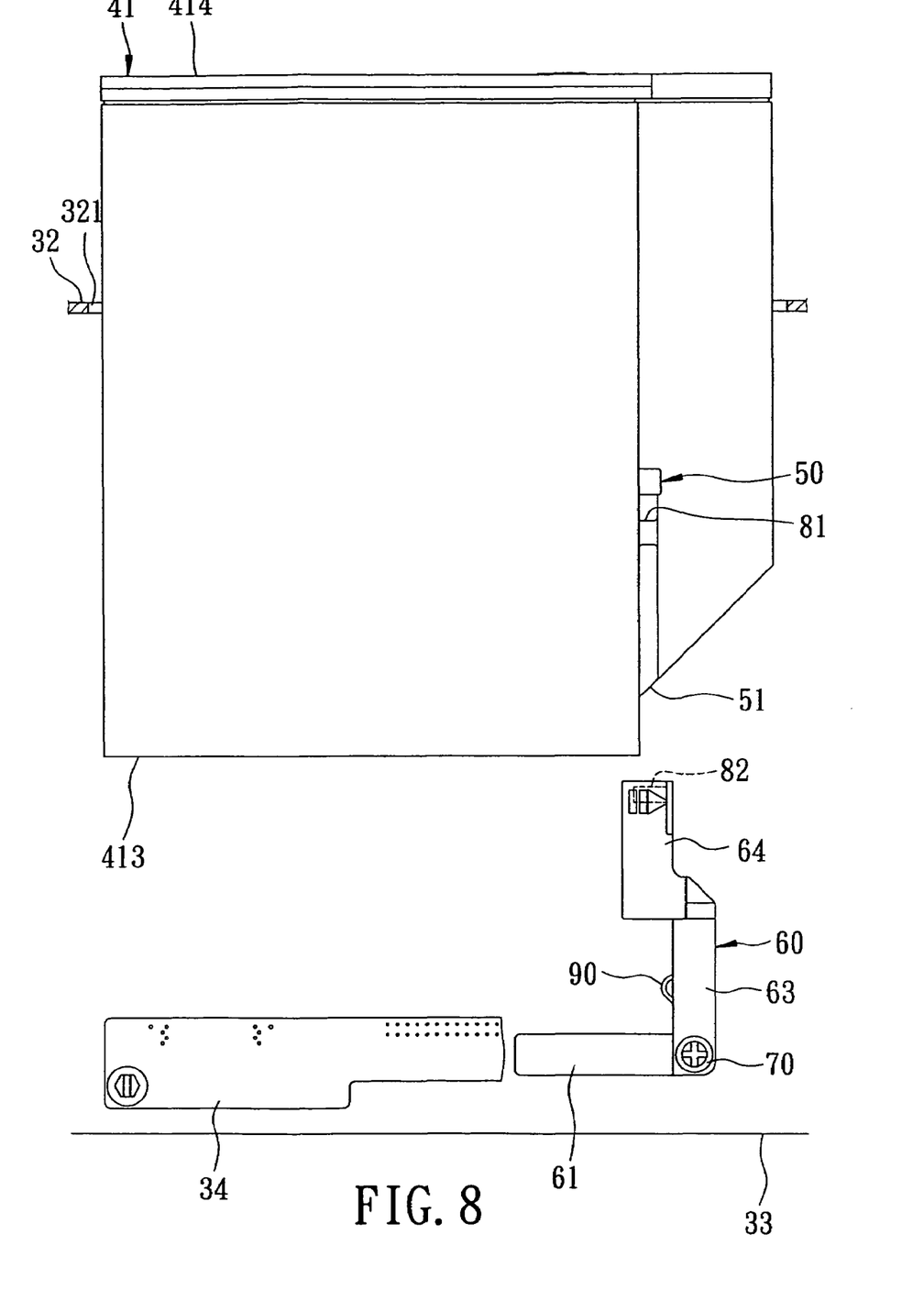
FIGS. 8 to 10 are schematic views to illustrate operation of the latch unit of the preferred embodiment during installation of the disk drive in the electronic device.

When it is desired to install the disk drive 41 in the electronic device 32, assuming that the disk drive casing 33 is already mounted on the disk drive bay of the electronic device 32, referring to FIG. 8, the rear end 413 of the disk drive 41 is inserted into the disk drive casing 33 through the front open end 321 of the disk drive bay of the electronic device 32. During this time, referring to FIG. 9, the second interlocking member 82 is pushed by the end portion of the latch member 50 and slides along the chamfer 51 (see FIG. 4) of the end portion of the latch member 50. This results in rotation of the pivot portion 62 of the operating member 60 in the first angular direction against the biasing action of the biasing member 90 until the second interlocking member 82 is aligned with the first interlocking member 81. By the time the second interlocking member 82 is aligned with the first interlocking member 81, referring to FIG. 10, the terminal 415 (see FIG. 4) of the disk drive 41 is connected to the electrical connector 34, and the pivot portion 62 of the operating member 60, due to the biasing action of the biasing member 90, rotates in the second angular direction, thereby resulting in extension of the second interlocking member 82 into the first interlocking member 81. Accordingly, the disk drive 41 is retained releasably in the disk drive casing 33.

Figure 9:
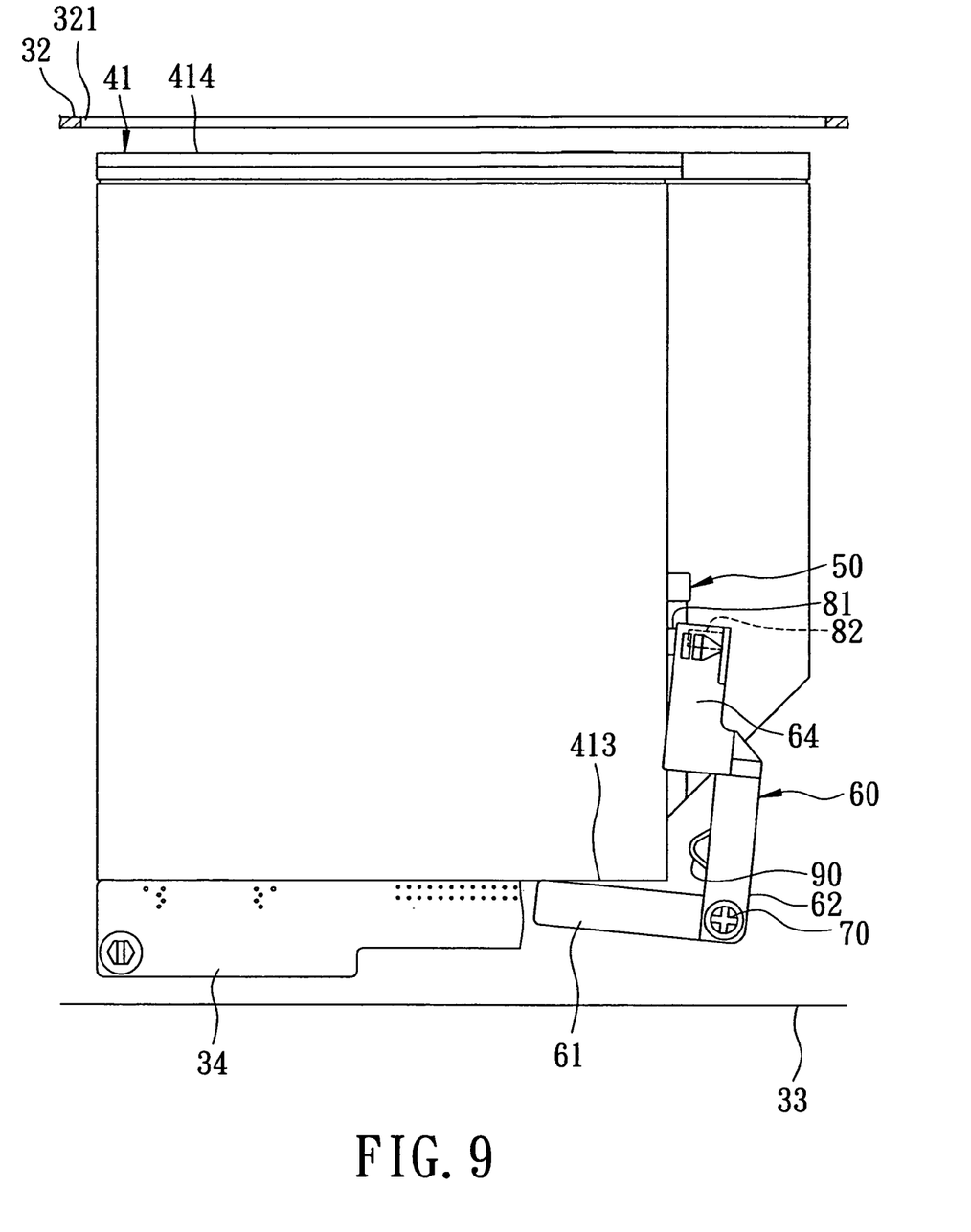
Figure 10:
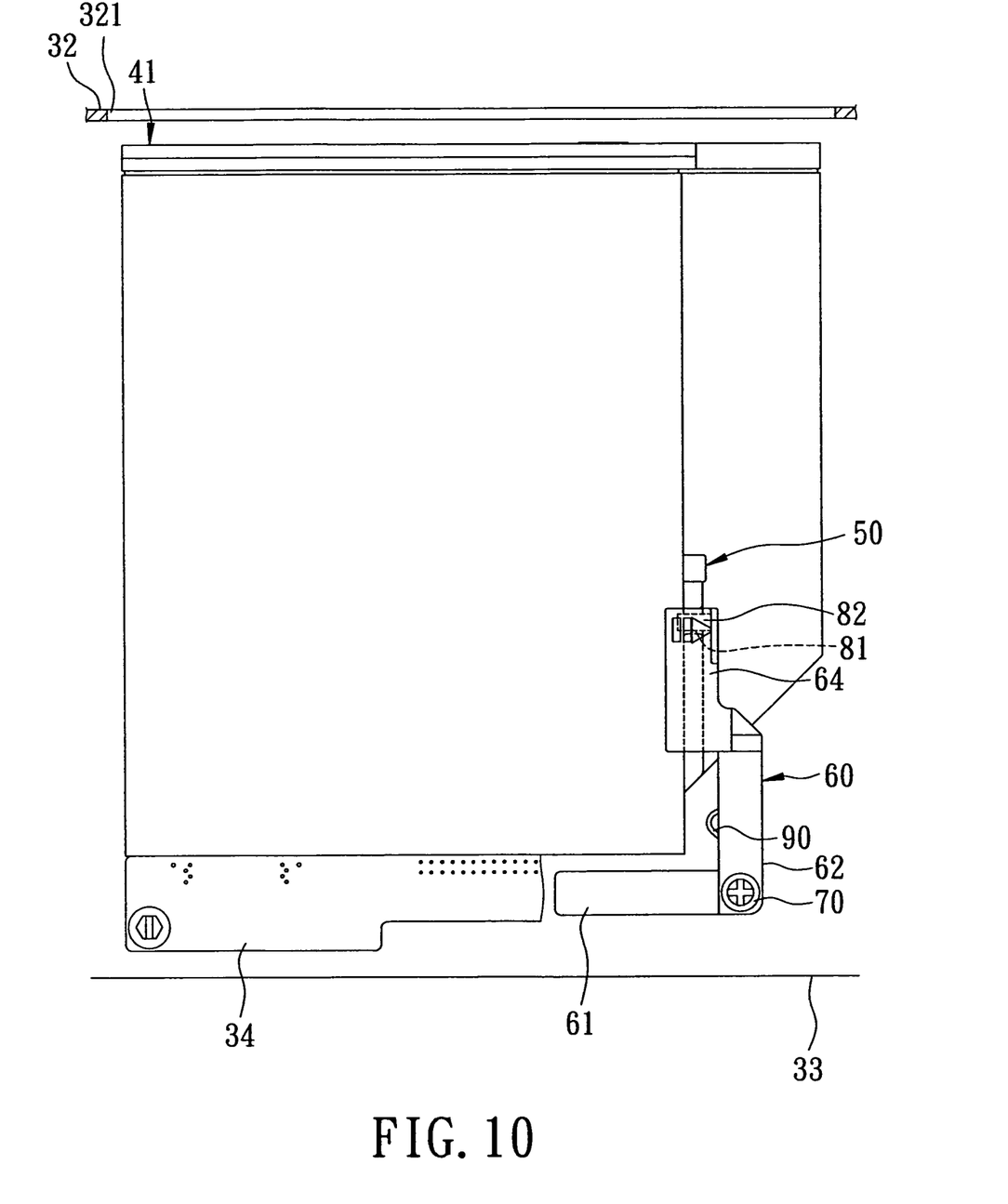
Figure 11:
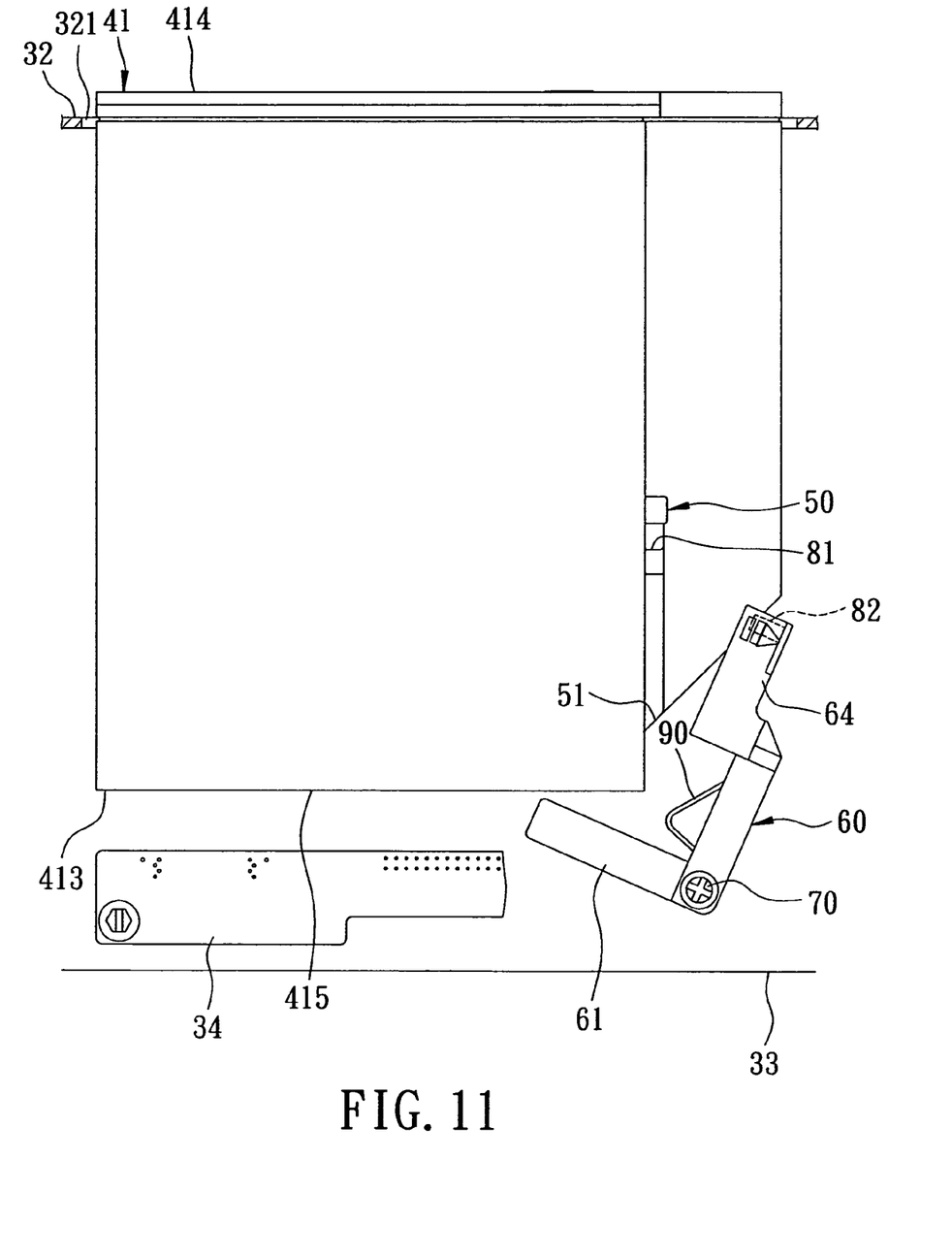
FIG. 11 is a schematic view to illustrate operation of the latch unit of the preferred embodiment during removal of the disk drive from the electronic device.

When it is desired to remove the disk drive 41 from the disk drive casing 33, referring to FIG. 9, the first end portion 64 of the operating member 60 is operated so as to rotate the pivot portion 62 of the operating member 60 in the first angular direction to thereby disengage the second interlocking member 82 from the first interlocking member 81. At the same time, the second end portion 61 of the operating member 60 presses against the rear end 413 of the disk drive 41. Further operation of the first end portion 64 of the operating member 60, referring to FIG. 11, permits the second end portion 61 of the operating member 60 to push the rear end 413 of the disk drive 41 such that the terminal 415 of the disk drive 41 is disconnected from the electrical connector 34, and such that the front end 414 of the disk drive 41 is disposed externally of the electronic device 32 through the front open end 321 of the disk drive bay of the electronic device 32.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An apparatus for mounting removably a disk drive in an electronic device, the disk drive having a front end, and a rear end that is opposite to the front end thereof and that is provided with a terminal, said apparatus comprising:
    a disk drive casing adapted to receive the disk drive therein and adapted to be mounted in the electronic device;
    an electrical connector provided in said disk drive casing, and adapted to be coupled electrically to the terminal of the disk drive when the disk drive is received in said disk drive casing; and
    a latch unit adapted for retaining removably the disk drive in said disk drive casing, said latch unit including
    a latch member adapted to be provided on the disk drive,
    a first interlocking member formed on said latch member,
    an operating member having a pivot portion that is pivoted to said disk drive casing, and first and second end portions that extend in different directions from said pivot portion, and
    a second interlocking member formed on said first end portion of said operating member, and engaging said first interlocking member when said electrical connector is connected to the terminal of the disk drive,
    wherein said first end portion of said operating member is operable so as to rotate said pivot portion of said operating member in a first angular direction such that said second interlocking member disengages from said first interlocking member, and such that said second end portion of said operating member pushes the rear end of the disk drive so as to disconnect the terminal of the disk drive from said electrical connector.

2. The apparatus as claimed in claim 1, wherein said latch unit further includes a biasing member for biasing said pivot portion of said operating member in a second angular position opposite to the first angular position.

3. The apparatus as claimed in claim 2, wherein said biasing member is a torsion spring that has a first spring end acting on said operating member and a second spring end acting on said disk drive casing.

4. The apparatus as claimed in claim 1, wherein said first interlocking member is in the form of an engaging groove, and said second interlocking member is in the form of an engaging protrusion.

5. The apparatus as claimed in claim 4, wherein said latch member has an end portion that is formed with a chamfer, wherein, when the disk drive is inserted into said disk drive casing, said second interlocking member slides along said chamfer of said end portion of said latch member to thereby result in rotation of said pivot portion of said operating member in the first angular direction.

* * * * *